US012461522B2

(12) United States Patent
Shapira et al.

(10) Patent No.: US 12,461,522 B2
(45) Date of Patent: Nov. 4, 2025

(54) SYSTEM AND METHOD TO FACILITATE REMOTE AND ACCURATE MANEUVERING OF UNMANNED AERIAL VEHICLE UNDER COMMUNICATION LATENCY

(71) Applicant: XTEND Reality Expansion Ltd., Tel-Aviv (IL)

(72) Inventors: Aviv Shapira, Tel-Aviv (IL); Matteo Shapira, Tel-Aviv (IL); Reuven Liani, Rosh Haayin (IL); Adir Tubi, Beer Yaacov (IL)

(73) Assignee: XTEND Reality Expansion Ltd., Tel-Aviv (IL)

( * ) Notice: Subject to any disclaimer, the term of this patent is extended or adjusted under 35 U.S.C. 154(b) by 0 days.

(21) Appl. No.: 17/497,035

(22) Filed: Oct. 8, 2021

(65) Prior Publication Data

US 2022/0113720 A1    Apr. 14, 2022

Related U.S. Application Data

(60) Provisional application No. 63/089,230, filed on Oct. 8, 2020.

(51) Int. Cl.
*G05D 1/00* (2024.01)
*B64U 10/14* (2023.01)
(Continued)

(52) U.S. Cl.
CPC .......... *G05D 1/0022* (2013.01); *G05D 1/101* (2013.01); *G08G 5/26* (2025.01); *G08G 5/55* (2025.01);
(Continued)

(58) Field of Classification Search
CPC .... G05D 1/0022; G05D 1/101; G05D 1/0038; B64C 39/024; B64D 47/08;
(Continued)

(56) References Cited

U.S. PATENT DOCUMENTS

| 2010/0259614 A1* | 10/2010 | Chen | G06T 7/246 |
| | | | 348/148 |
| 2019/0122640 A1* | 4/2019 | Kim | G01C 23/00 |
| 2019/0361436 A1* | 11/2019 | Ueda | G08G 1/09 |

FOREIGN PATENT DOCUMENTS

| CN | 207753725 U | * | 8/2018 | |
| CN | 108885461 A | * | 11/2018 | G05D 1/106 |

(Continued)

OTHER PUBLICATIONS

English Translation for WO-2018123747-A1 (Year: 2018).*
English Translation for CN-108896018-A (Year: 2018).*

*Primary Examiner* — Faris S Almatrahi
*Assistant Examiner* — Moises Gasca Alva
(74) *Attorney, Agent, or Firm* — The IP Law Firm of Guy Levi, LLC

(57) ABSTRACT

A ground control station configured to establish a communication channel with an Unmanned Aerial Vehicle (UAV), to receive a second marked singular point indicative of an Area of Interest (AOI) and based on user input, to transmit, to the UAV, the second marked singular point, which is configured to instruct the UAV to move towards the second marked singular point, to receive, from the UAV, live video including the AOI, to determine a latency of the live video, to determine a first marked singular point based on the determined latency of the live video, to render a display video using the live video, the second marked singular point, and the first marked singular point, wherein the display video further includes a visual connection between the second marked singular point and the first marked singular point, and to display the rendered display video.

18 Claims, 11 Drawing Sheets

(51) Int. Cl.
*B64U 30/26* (2023.01)
*B64U 101/30* (2023.01)
*G08G 5/26* (2025.01)
*G08G 5/55* (2025.01)
*G08G 5/57* (2025.01)
*H04N 5/272* (2006.01)
*H04N 7/18* (2006.01)

(52) U.S. Cl.
CPC ............... *G08G 5/57* (2025.01); *H04N 5/272* (2013.01); *H04N 7/183* (2013.01); *B64U 10/14* (2023.01); *B64U 30/26* (2023.01); *B64U 2101/30* (2023.01); *B64U 2201/10* (2023.01); *B64U 2201/20* (2023.01)

(58) Field of Classification Search
CPC .. G08G 5/0013; G08G 5/0069; G08G 5/0026; H04N 5/272; H04N 7/183; H04N 7/185; B64U 10/13; B64U 2101/30; B64U 2201/20
See application file for complete search history.

(56) References Cited

FOREIGN PATENT DOCUMENTS

| CN | 108896018 A | * | 11/2018 | |
|---|---|---|---|---|
| WO | WO-2018123747 A1 | * | 7/2018 | ............. A63H 30/04 |

* cited by examiner

ABSTRACT
SYSTEM AND METHOD TO FACILITATE REMOTE AND ACCURATE MANEUVERING OF UNMANNED AERIAL VEHICLE UNDER COMMUNICATION LATENCY

CROSS-REFERENCE TO RELATED APPLICATIONS

This application claims benefit of and priority to U.S. Provisional Patent Application Ser. No. 63/089,230 filed Oct. 8, 2020, titled SYSTEM AND METHOD TO FACILITATE REMOTE AND ACCURATE MANEUVERING OF UNMANNED AERIAL VEHICLE UNDER COMMUNICATION LATENCY, and is hereby incorporated by reference in its entirety, to the extent it is not inconsistent herewith.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

Embodiments of the present invention generally relate to the field of Unmanned Aerial Vehicles (UAVs). In particular, embodiments of the present invention relate to a system and method to enable remote and accurate maneuvering of UAVs from a remote location when there is a high degree of video and/or communication latency between the UAV and the remote location.

Existing systems and methods for remotely controlling and maneuvering unmanned vehicles or unmanned aerial vehicles (UAVs) at an area of interest (AOI) generally involve the use of a remote controller in communication with the UAV through a ground control station (GCS) being positioned at a remote location away from the UAV. Further, a camera(s) associated with the UAV transmits a live video feed of the area of interest to the GCS, which then transmits the live video feed to a display screen or other display devices associated with the user. The received video feed facilitates the users to accordingly operate the remote controller to control and maneuver the UAV from the remote location. However, due to latency in video and/or communication between the UAV and the GCS, the video feed from the UAV is received at the GCS and the user after a delay. As a result, a response time lag can occur between the actual actuation of the remote controller by the user, and the video feed of the AOI being received by the user, thereby making it difficult for the user to understand the actual position of the UAV in the AOI, and how much movement the user is exerting on the UAV using the remote controller. This response time lag can lead to a collision and uncontrolled movement of the UAV.

Under optimal latency under 250 ms, the user can easily fly the UAV faster and accurately with a good response time. Further, under flyable latency between 250-750 ms, the user can fly the UAV with some difficulty and at low speed only. Furthermore, a non-flyable latency greater than 1000 ms, the latency becomes too long to respond, thereby making it difficult for the user to remotely and accurately operate and maneuver the UAV from the remote location.

There is therefore a need to overcome the above shortcomings and provide a system and method to enable remote and accurate maneuvering of UAVs from a remote location under a high degree of video and/or communication latency between the UAV and the GCS and user at the remote location.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
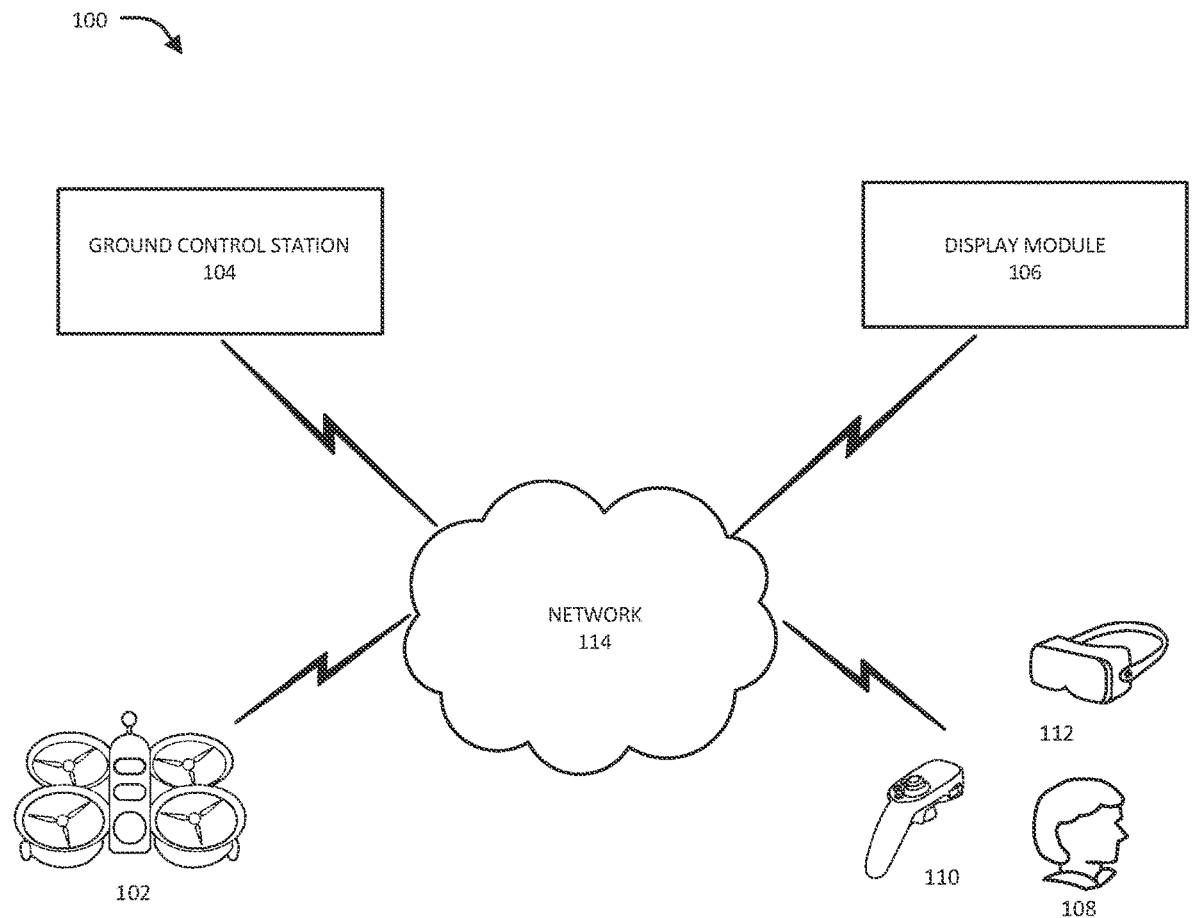
FIG. 1 illustrates a network diagram of the proposed system for accurately maneuvering an UAV under communication latency in accordance with an embodiment of the present invention.

Provided herein are exemplary embodiments and implementations of the proposed system and method to enable remote and accurate maneuvering and directing of UAVs from a remote location when there is a high degree of video and/or communication latency between the UAV and the remote location. The proposed system and method provide a ground control station (GCS) at the remote location with a video feed (being captured by the UAV) of an area of interest (AOI) of a predefined location, after a time T from actual capturing of the video by the UAV, due to latency in video and communication between the UAV and the GCS. The GCS can receive control commands directly from a controller associated with the user, and transmit the video feed along with interactive marker(s) and/or a virtual UAV being overlaid on top of the video feed of the AOI to a display module, such as a video monitor or VR headset associated with the user, to facilitate the user to assess how much movement the user is exerting on the UAV through the controller (in communication with the UAV), and also see how the actual UAV will perform or maneuver in the AOI after time T, thereby facilitating the user to continuously assess and rectify maneuvering or directing of the UAV in the AOI.

The disclosed technology provides a system and method that can provide the GCS at the remote location with a video feed of the AOI being captured by an imaging module or camera of the UAV along with a first marker (also referred to as first mark & fly marker, herein) being overlaid on top of the video feed, after a time T from actual capturing of the video by the UAV due to latency of time T in video and communication between the UAV and the GCS. Further, the GCS can receive a second marker (also referred to as second mark & fly marker) corresponding to a position in the AOI where the user wishes the UAV to go to. The second marker can be marked through the controller based on the actuation or movements of the controller, directly from the controller associated with the user with very low latency (under 50 ms). The second marker and the first marker can be in the form of a three-dimensional vector emanating from the screen (e.g., a raycast or a ray trace). The GCS can further overlay both the first marker and second marker on top of the video feed, and render the video feed along with the two markers and other elements to the display module, such as a VR headset or head mount display (HMD) associated with the user. The second marker can be communicated between the controller, the GCS, and the display module, such as a laptop, an augmented reality headset, or a VR headset, with very low latency (under 50 ms). The second marker can correspond to a position in the AOI as marked through the controller, and the first marker can correspond to the second marker but with a latency of time T, and trailing and following the second marker in "a snake-like" connection. The snake like connection of the two markers provides the user with a path on the video feed that gradually fades and assists the user to see what the marker will do until the control commands from the controller are registered as flight commands. The rendered video feed of the AOI along with the two markers in the snake like connection can facilitate the user to assess how much movement the user is exerting on the UAV through the controller, thereby facilitating the user to continuously assess and rectify maneuvering or directing of the UAV in the AOI.

The disclosed technology provides a system and method that can provide the GCS at the remote location with a video feed of the AOI being captured by the UAV, after a time T from actual capturing of the video by the UAV, due to latency of time in video and, communication between the UAV and the GCS. Further, the GCS can further directly receive singular mark & fly commands from the controller. Upon pressing a trigger of the controller for a predefined time, the GCS can generate a raycast vector emanating in the video feed of the AOI. As long as the trigger is kept pressed, the GCS can make the raycast longer (further into a distance) in the video feed. Once, the trigger is released, a singular mark & fly point (also referred to as marked singular point, herein) is detected and transmitted to the UAV, and accordingly persistently maneuvering the UAV to the marked singular point in the 3D physical space of the AOI while simultaneously estimating the UAV's location to the marked singular point. The raycast vector and step by step marking of the marked singular point, by the user, on top of the video feed of the AOI facilitates the user to continuously assess and rectify maneuvering of the UAV in the AOI, as the marked singular points) allows the user to make one leap after the next in space (AOI), irrelevant and independent of latency (as long as the scene itself remains static).

The disclosed technology provides a system and method that can provide the GCS at the remote location with a video feed of the AOI being captured by the UAV, after a time T from actual capturing of the video by the UAV, due to latency of time T in video and communication between the UAV and the GCS. Further, the GCS can receive command, signals directly from the controller, corresponding to a real-time mark & fly position of the UAV in the AOI based on the actuation or movement of the controller. The GCS can assess the latency, and the command signals being received directly from the controller, and can accordingly determine how the actual UAV shall perform or maneuver in the AOI after time T. The GCS can extrapolate (simulate) position and orientation of the UAV in the AOI for a predefined number of frames in the time T (latency), and further assesses the rotation of the imaging module or camera of the UAV for the predefined number of frames based on the extrapolated orientation of the UAV. The GCS can then provide the user with a virtual UAV having a trailing tail being overlaid on top of the video feed, for each predefined number of frames. In addition, since the UAV is always moving forward, the virtually extrapolated UAV will always be in front of user's view plane (camera), thereby facilitating the user to continuously assess and rectify maneuvering or directing of the UAV in the AOI.

In an embodiment, the system herein can allow the user to manually control and maneuver the UAV using the controller or mobile computing devices associated with the user, and assess how much movement the user is exerting on the UAV through the controller, and, also see how the actual UAV will perform or maneuver in the AOI in predefined frames of latency T, thereby facilitating the user to continuously assess and rectify maneuvering or directing of the UAV in the AOI.

In an embodiment, the UAVs can have the capability to travel in space physically and precisely (3D environments) to reach and travel in the AOI at predefined locations. The UAVs can be sized, adapted, and configured to be able to continually compare the location of the UAVs in physical space to the precise point in the predefined locations via proprietary sensor fusion algorithms that allow the drones to estimate the drone's temporospatial position with great accuracy in variable indoor and outdoor environments. Thus, allowing the user or operator to maneuver the UAVs within both indoor or outdoor or other dynamic locations with great accuracy.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any later-developed elements that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing these inventions. The present disclosures, more particularly, relate to systems and methods to enable remote and accurate maneuvering of UAVs from a remote location under a high degree of video and/or communication latency between the UAV and the GCS and user at the remote location, which provides users with a control mechanism that realizes where the user wishes the UAV to go or reach based on a first person view (FPV)/video representations, and assist them with latency graphics solutions. However, those skilled in the art would understand that the exemplary hardware, software, processes, methods, and/or operating systems described herein are for illustrative purposes and, thus, are not intended to be limited to just the named particulars.

Figure 2:
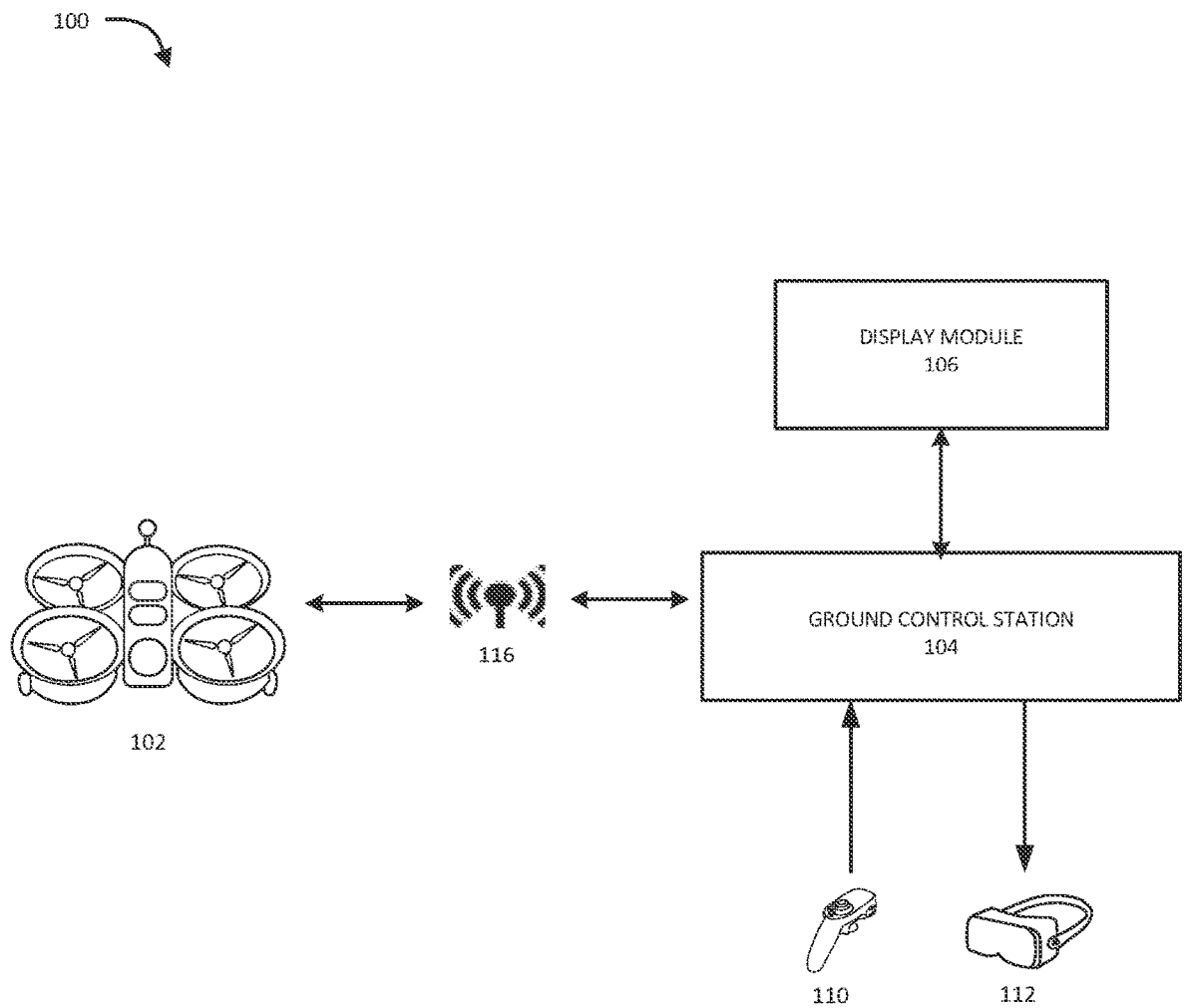
FIG. 2 illustrates a block diagram of the proposed system in accordance with an embodiment of the present invention.

As illustrated in FIGS. 1 and 2, the proposed system 100 can include a ground control station (GCS) 104 (also referred to as central processing module (CPM) 104, herein) being positioned at a local onsite location. The GCS 104 can be communicatively coupled with one or more UAVs 102 (individually referred to as UAV 102 or drone 102, herein), a display module 106, and a remote controller 110 (also referred to as controller 110, herein), and VR headset or HMD 112 associated with user 108 through a network 114. The GCS 104 can directly communicate with the UAV 102 and can further allow interaction and communication of the UAV 102 with remote controller 110, and VR headset or HMD 112. Further, users 108 associated with the GCS 104 can remotely control the UAVs 102 at a predefined location or dynamic location. When the users 108 operate the UAV 102 at the predefined location, the GCS 104 can facilitate the users 108 in controlling the UAV 102 using the controller 110. In an implementation, the system 100 can be accessed using a virtual private network (VPN) or a server that can be configured with any operating system to provide secure communication in the system 100. The GCS 104, the controller 110, the display module 106, and the VR headset 112, can be in communication with each other with very low latency (under 50 ms), which does not significantly affect communication between them.

The controller 110 or mobile computing devices associated with the user can communicate with the UAV 102, and the GCS 104 through the network 114 regarding the controlled operation of the UAV 102 by the users 108. Further, users 108 present at the remote location or the predefined location can communicate with the UAV 102 to get the VR based view of the predefined location using the VR headset or HMD 112, or display module 106 associated with the user 108, and accordingly, control the maneuvering and threat handling operations of the UAV 102. Furthermore, users 108 present at the remote location or the predefined location can communicate with the UAV 102 to get a real-time camera view of an area of interest (AOI) at the predefined location using the display module 106, or display of mobile computing devices or VR headset (or HMD) 112, and can accordingly control the maneuvering operations of the UAV 102 using the controller 110 or pointer devices, or the like.

In an implementation, the GCS 104 at the remote location can receive a video feed of the AOI, through the network 114, being captured by the imaging module or camera of the UAV 102 along with a first marker (also referred to as first mark & fly marker, herein) being overlaid on top of the video feed, after a time T from actual capturing of the video by the UAV 102 due to latency of time T in video and communication between the UAV and the GCS. Further, the GCS 104 can receive a second marker (also referred to as second mark & fly marker) corresponding to a position in the AOI where the user wishes the UAV to go to, based on actuation or movements of the controller 110, directly from the controller 110 associated with the user 108 through the network 114 with almost no or negligible latency. The GCS 104 can further overlay both the first marker and second marker on top of the video feed, and render the video feed along with the two markers and other elements to the display module 106 or VR headset 112 associated with the user 108 through the network 114. The second marker can correspond to a position in the AOI where the user wishes the UAV to go to, as marked through the controller 110, and the first marker can correspond to the second marker but with a latency of time T, and trailing and following the second marker in "a snake-like" connection. The snake like connection of the two markers provides the user with a path that gradually fades and assists the user 108 to see what the marker will do until the control commands from the controller is registered as flight commands. The rendered video feed of the AOI along with the two markers in the snake like connection can be transmitted to display module 106 or VR headset of the user 108, to facilitate the user 108 to assess how much movement the user is exerting on the UAV 102 through the controller 110, thereby facilitating the user 108 to continuously assess and rectify maneuvering or directing of the UAV 102 in the AOI.

In another implementation, the GCS 104 at the remote location can receive a video feed of the AOI being captured by the UAV 102, through the network 114, after a time T from actual capturing of the video by the UAV 102 due to latency of time T in video and communication between the UAV 102 and the GCS 104. Further, the GCS 104 can directly receive singular mark & fly commands from controller 110 through the network 114. Upon pressing a trigger of the controller 110 for a predefined time, the GCS 104 can generate a raycast vector emanating in the video feed of the AOT. As long as the trigger is kept pressed, the GCS 104 can make the raycast longer (further into a distance) in the video feed. Once, the trigger is released, a singular mark & fly point is detected and transmitted to the UAV 102, and accordingly persistently maneuvering the UAV 102 to the marked singular point in the 3D physical space of the AOT while simultaneously estimating the UAV's location to the singular point. The raycast vector and marked singular point being overlaid on top of the video feed can be transmitted to display module 106 or VR headset 112 of the user 108. The ray cast vector and step by step marking of the marked singular point, by the user, on top of the video feed can facilitate the user 108 to continuously assess and rectify maneuvering of the UAV 102 in the AOI, as the singular point(s) allows the user to make one leap after the next in space (AOI), irrelevant of latency (as long as the scene itself remains static).

In yet another implementation, the GCS 104 at the remote location can receive a video feed of the AOI being captured by the UAV 102 through the network 114, after a time T from actual capturing of the video by the UAV 114 due to latency of time T in video and communication between the UAV 102 and the GCS 104. Further, the GCS 104 can receive command signals directly from the controller 110, corresponding to a real-time mark & fly position of the UAV in the AOI based on the actuation or movement of the controller 110 (as marked by the user 108). The (JCS 104 can assess the latency, and the command signals being received directly from the controller 110 through the network 114, and can accordingly determine how the actual UAV 102 shall perform or maneuver in the AOI after time T. The GCS 104 can extrapolate (simulate) position and orientation of the UAV 102 in the AOL for a predefined number of frames in the time T (latency), and further assesses rotation of the imaging module or camera of the UAV 102 for the predefined number of frames based on the extrapolated orientation of the UAV. The GCS 104 can then transmit the video feed having a virtual UAV having a trailing tail being overlaid on top of the video feed, for each predefined number of frames, to the display module 106 or VR headset 112 through the network 114. In addition, since the UAV is always moving forward, the virtually extrapolated UAV will always be in front of user's view plane (camera), thereby facilitating the user 108 to continuously assess and rectify maneuvering or directing of the UAV 102 in the AOI System 100 can be implemented using any or a combination of hardware components and software components such as a cloud, a server, a computing system, a computing device, a network device, and the like. Further, the GCS 104 can communicatively interact with UAV 102, and remote controller 110, VR headset 112, and mobile computing devices associated with user 108 through a secured communication channel provided by communication units such as Wi-Fi, Bluetooth, Li-Fi, or an application, that can reside in the GCS 104, UAV 102, and remote controller 110, VR headset 112, and mobile computing devices associated with users 108. The system can include a transceiver 116 configured to create a two-way communication channel between the UAV 102, and the GCS 104. The components of the system can be communicatively coupled to each other though wireless data and video communication including Radio communication, digital communication, cellular communication, and the likes.

Further, the network 114 can be a wireless network, or a combination of wired and wireless network, that can be implemented as one of the different types of networks, such as Intranet, Local Area Network (LAN), Wide Area Network (WAN), Internet, and the like. Further, the network 114 can either be a dedicated network or a shared network. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), and the like.

Figure 3:
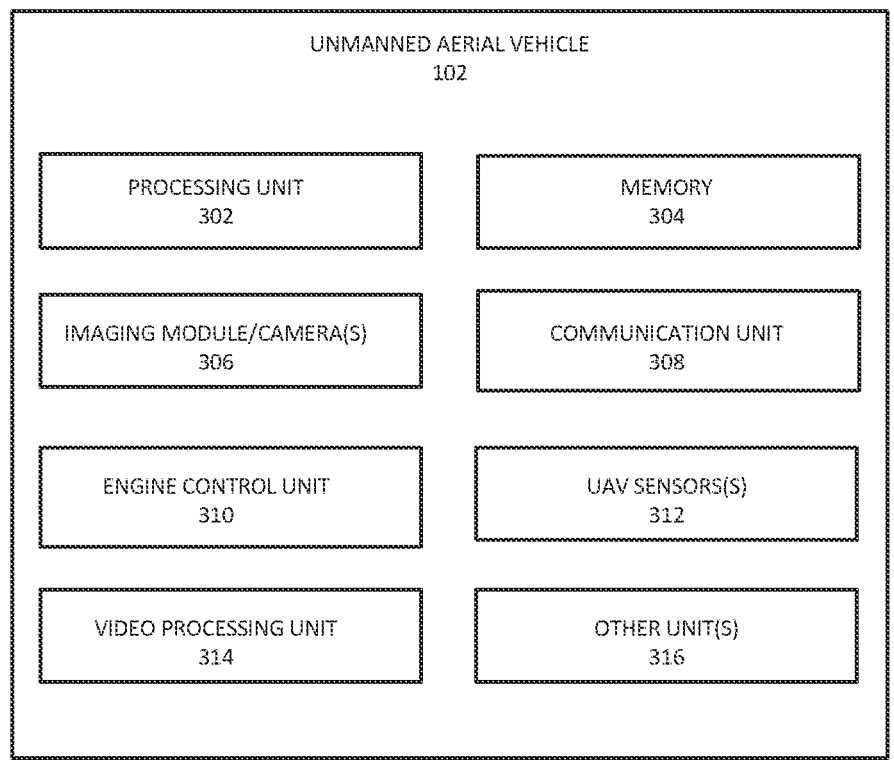
FIG. 3 illustrates a representation of UAV architecture in accordance with an embodiment of the present invention.

As illustrated in FIG. 3, the UAV architecture is illustrated. The UAV 102 can include a processing unit 302 comprising processors configured with a processor-readable memory 304 having thereon a set of executable instructions, configured, when executed, to cause the processor to operate the UAV 102, and enable communication between the UAV 102 and any or a combination of the GCS 104, remote controller 110, and mobile computing device. The UAV 102 can include an imaging module 306 comprising camera(s) to capture a set of images (video feed) of an area of interest (AOI) at the predefined location. The UAV 102 can include a communication unit 308 that can be a Radio Frequency (RF) transceiver, WiFi Module, or cellular networks, but not limited to the likes. The communication unit 308 can be operatively coupled to the processing unit 302, and configured to communicatively couple the UAV 102 with GCS 104, remote controller 110, and mobile computing devices.

The camera(s) 306 of the UAV 102 can capture at least one real-time image or video of the AOI in the predefined location, and correspondingly generate and transmit a set of video signals to the GCS 104. The cameras) 306 can further comprise analog camera(s), one or more digital cameras, charge-coupled devices (CCDs), a complementary metal-oxide-semiconductor (CMOS), or a combination comprising one or more of the foregoing. If static images are required, the camera can be a digital frame camera. The camera(s) 306 can be a night vision camera to allow the UAV 102 to capture video and provide a live feed of the predefined location at night or in low light conditions.

The UAV 102 can include an engine control unit 310 comprising engines, propellers, motors, and actuators, but not limited to the likes, being operatively coupled to one another and the processing unit 302, to maneuver and operate the movement of the UAV 102. The engine control 310 unit can be operatively coupled to the processing unit 302, and configured to receive a set of control signals from any or a combination of the GCS 104, remote controller 110, and mobile computing devices, to instruct the engine control unit 310 to maneuver and operate the movement of the UAV 102. The UAV 102 can stay at a static position inside the predefined location.

The UAV 102 can further include a set of UAV sensors 312 (also referred to as UAV sensors 312, herein) along with the communication unit 308 to maintain two-way communication between the UAV 102, and GCS 104 and/or mobile computing device. The sensors 312 along with the cameras 306, can continually estimate and assess mismatch between the marked position on the AOI, and the real position and speed of the UAV 102, performing sensor fusion and estimation, and continuously correcting the flight path to match the predetermined flight vector and speed. Sensors 312 can include a 12 degrees of freedom. (DOF) sensor reference platform, pressure gauge(s), accelerometers, Lidars, ToF, Sonars, Accelerometers, Gyros, GPS, MonoCam SLAM, StereoCam SLAM. The implementation of the user experience and flight accuracy of the drones can be built upon a proprietary set of algorithms that allows creating both a static and progressive (machine learning, neural network) network of potentially endless sensors disposed on the drone itself and potentially within the flight route, used to adjust and correct the accuracy, precision and resolution of the UAV 102 in infinitely complex real-world environments, where each is characterized by different physical attributes such as light, texture, humidity, complexity, aerial pressure, physical barriers, shielding structures and so on. The fusion of the algorithm network is configured to gather and process the information gathered from the environment along the flight route and performs fusion & filtering and performs a prediction (estimation) of where it assesses the UAV's location and projected transformation (speed vector), and derives the necessary flight control commands needed to compensate between the predefined location as well as speed vector; and the estimated mismatch to that request. The algorithm networks can statically or dynamically improve the estimation by learning (dynamically) or configuring (statically) the weights (balance) between all active sensors to create the most accurate location and speed vector estimation, to continuously correct the flight patch to reach the predefined location 200.

The UAV 102 can include a video processing unit 314 operatively coupled to the processing unit 302, and configured to decode or encrypt the images or videos captured by the camera(s) 306 of the UAV 102. The communication unit 308 can then transmit the decoded or encrypted video to the GCS 104, and/or display module 106, through the network 114, thereby enabling secure transmission of video signals between the UAV 102 and the GCS 104, and/or display module 106. In an implementation, the video processing unit 314 can generate a first marker (based on data from the GCS 104), and overlay the first marker on top of the video feed captured by the camera(s) 306 of the UAV 102. Further, the communication unit 308 can transmit the decoded or encrypted video having the first marker overlaid on it, to the GCS 104, and/or display module 106, through the network 114.

The other units 316 of the UAV 102 can further include a telemetry Blackbox to store all the captured videos, and flight path data, but not limited to the likes. The UAV 102 can be configured with a global positioning system (GPS) module being operatively coupled to the processing unit 302, to monitor the real-time, precise, and accurate location of the UAV 102. The UAV 102 can also be configured with a microphone being operatively coupled to the processing unit 302, to sense acoustic signals around the UAV 102 at the predefined location.

Figure 4:
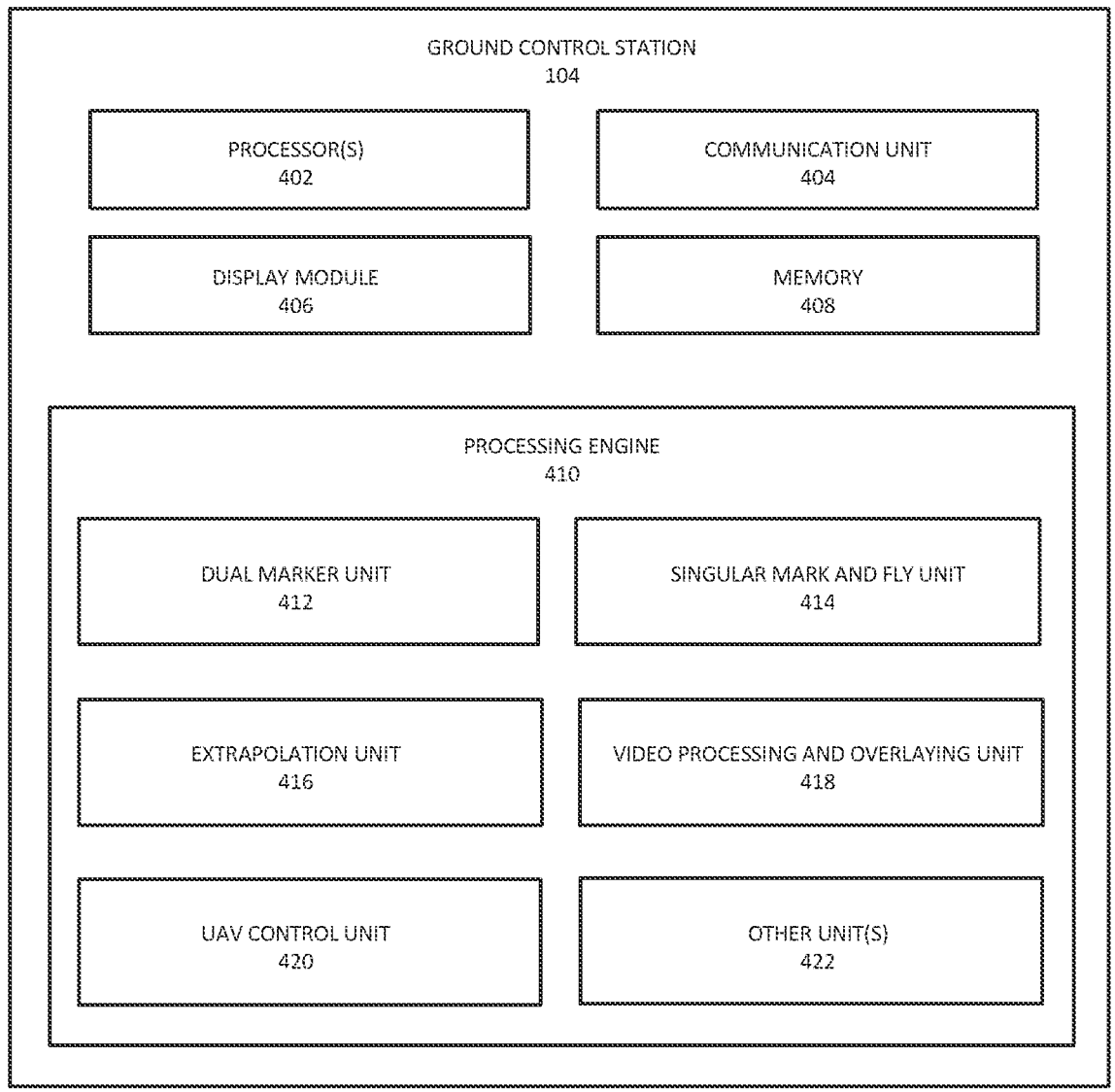
FIG. 4 illustrates a representation of a ground control station (GCS) architecture of the proposed system in accordance with an embodiment of the present invention.

As illustrated in FIG. 4, the ground control station (GCS) 104 can include one or more processor(s) 402. The one or more processor(s) 104 can be implemented as one or more microprocessors, microcomputers, microcontrollers, digital signal processors, central processing units, logic circuitries, and/or any devices that manipulate data based on operational instructions. Among other capabilities, the one or more processor(s) 402 are configured to fetch and execute a set of computer-readable instructions stored in a memory 408 of the GCS 104, The memory 408 can store one or inure computer-readable instructions or routines, which may be fetched and executed to create or share the data over a network service. The memory 408 can include any non-transitory storage device including, for example, volatile memory such as RAM, or non-volatile memory such as EPROM, flash memory, and the like The GCS 104 can include a communication unit 404, which can be a Radio Frequency (RF) transceiver, WIFI Module, but not limited to the likes. The communication unit 404 can be operatively coupled to the processors 402, and configured to communicatively couple the GCS 104 with the UAV 102, remote controller 110, VR headset (or HMD) 112, display module (106), and mobile computing devices associated with the user. The GCS 104 can also include a display module 406 to provide live and/or recorded feed of video of the predefined location, being captured by the cameras 306 of the UAV 102. The GCS 104 can also include an interface(s). The interface(s) can include a variety of interfaces, for example, interfaces for data input and output devices, referred to as I/O devices, storage devices, and the like. The interface(s) can facilitate communication between various one or more components of the GCS 104. The interface(s) can also provide a communication pathway for the one or more components of the GCS 104. Examples of such components include, but are not limited to, processing engine(s) 410, communication unit 404, display module 406, memory 408, but not limited to the likes.

The processing engine(s) 410 can be implemented as a combination of hardware and programming (for example, programmable instructions) to implement one or more functionalities of the processing engine(s) 410. In examples described herein, such combinations of hardware and programming may be implemented in several different ways. For example, the programming for the processing engine(s) 410 may be processor-executable instructions stored on a non-transitory machine-readable storage medium, and the hardware for the processing engine(s) 410 may include a processing resource (for example, one or more processors), to execute such instructions. In the present examples, the machine-readable storage medium may store instructions that, when executed by the processing resource, implement the processing engine(s). In such examples, the GCS 104 can include the machine-readable storage medium storing the instructions and the processing resource to execute the instructions, or the machine-readable storage medium may be separate but accessible to GCS 104 and the processing resource. In other examples, the processing engine(s) 410 may be implemented by electronic circuitry. The memory can include data that is either stored or generated as a result of functionalities implemented by any of the components of the processing engine(s) 410.

The processing engine(s) 410 can include a dual marker unit 412, a singular mark and fly unit 414, an extrapolation unit 416, a video processing and overlaying unit 418, an UAV control unit 420, and other units(s) 422. The other unit(s) can implement functionalities that supplement applications or functions performed by the GCS 104 or the processing engine(s) 410.

The dual marker unit 412 can enable the processors 402 to receive the video feed of the AOI along with a first marker (also referred to as first mark & fly marker, herein) being overlaid on top of the video feed, from the UAV 102. The video feed can be received after a time T from actual capturing of the video by the UAV 102 due to latency of time T in video and communication between the UAV and the GCS. Further, the dual marker unit 412 can enable the processors 402 to receive a position in the AOI where the user wishes the UAV to go to, based on actuation or movements of the controller 110, directly from the controller 110 with almost no or negligible latency, and correspondingly generate a second marker (also referred to as second mark & fly marker). The video processing and overlaying unit 418 can further enable the processors 402 to overlay both the first marker and second marker on top of the video feed, and render the video feed along with the two markers and other elements to the display module 106 or VR headset 112 associated with the user 108. The video processing and overlaying unit 418 can emulate the second marked and the first marker in form of a three-dimensional vector emanating from the screen (raycast). The second marker can correspond to an estimated position in the AOI where the user wishes the UAV 102 to go to, as marked through the controller 110, and the first marker can correspond to the second marker but with a latency of time T, and trailing and following the second marker in the "snake-like" connection. For instance, if the latency T is known, then we can see a gradual graphic "decay" per each frame N until reaching the latency barrier (N+T). For example, if T=1000 ms, we will have 1000 gradually decaying in the second marker until we see the first marker starting to move and follow the second marker. The rendered video feed of the AOI along with the two markers can be transmitted to display module 106 or VR headset or display module 106 of the user 108 under low latency of 50 ms, by the communication unit 404, to facilitate the user 108 to assess how much movement the user is exerting on the UAV 102 through the controller 110, thereby facilitating the user 108 to continuously assess and rectify maneuvering or directing of the UAV 102 in the AOI.

The singular mark and fly unit 414 can enable the processors to receive a video feed of the AOI being captured by the UAV 102. The video feed can be received by the processors 402 after a time T from actual capturing of the video by the UAV 102 due to latency of time T in video and communication between the UAV 102 and the GCS 104. Further, the singular mark and fly unit 414 can enable the processors to directly receive singular mark & fly commands from controller 110, with almost no or negligible latency. Upon pressing a trigger of the controller 110 for a predefined time, the processors 402 can generate a raycast vector emanating in the video feed of the AOI. As long as the trigger is kept pressed, the processors 402 can make the raycast longer (further into a distance) in the video feed. Once, the trigger is released, a singular mark & fly point in the AOI can be detected by the processors 402, and the communication unit 404 can correspondingly transmit the detected singular mark & fly point to the UAV 102. The video processing and overlaying unit 418 can enable the processors 402 to overlay the raycast vector and marked singular point on top of the video feed, which can be transmitted to display module 106 or VR headset of the user 108. The ray cast vector and step by step marking of the marked singular point, by the user, on top of the video feed can facilitate the user 108 to continuously assess and rectify maneuvering of the UAV 102 in the AOI, as the singular point(s) allows the user to make one leap after the next in space (AOI), irrelevant of latency (as long as the scene itself remains static). In an exemplary embodiment, the engine control unit 310 of the UAV 102 can then accordingly persistently maneuvering the UAV 102 to the marked singular point in the 3D physical space of the AOI while simultaneously estimating the UAV's location to the singular point, based on the step by step singular position(s) markings by the user.

The extrapolation unit 416 can enable the processors 402 to receive a video feed of the AOI being captured by the UAV 102. The video feed can be received by the processors 402 after a time T from actual capturing of the video by the UAV 102 due to latency of time T in video and communication between the UAV 102 and the GCS 104. Further, the processors 402 can receive command signals corresponding to a real-time mark & fly position of the UAV in the AOI based on actuation or movement of the controller 110, directly from the controller 110, with almost no or negligible latency. The processors 402 can assess the latency, and the command signals being received directly from the controller 110, and can accordingly determine how the actual UAV 102 shall perform or maneuver in the AOI after time T. The extrapolation unit 416 can enable the processors to extrapolate (simulate) position and orientation of the UAV 102 in the AOI for a predefined number of frames in the time T (latency), and further assesses rotation of the imaging module or camera(s) 306 of the UAV 102 for the predefined number of frames based on the extrapolated orientation of the UAV. The processors 402 can then generate and transmit the video feed having a virtual UAV having a trailing tail being overlaid on top of the video feed, for each predefined number of frames, to the display module 106 or VR headset 112. In addition, since the UAV 102 is always moving forward, the virtually extrapolated UAV will always be in front of user's view plane (camera), thereby facilitating the user 108 to continuously assess and rectify maneuvering or directing of the UAV 102 in the AOI The UAV control unit 420 can enable the processors 402 to transmit a set of first control signals to the UAV 102. The UAV 102, upon receiving the set of first control signals, can reach the marked position at the predefined location either automatically or using remote controller 110. The UAV control unit 420 can determine an optimum flight path and speed for the UAV 102 to reach the marked position. The UAV control unit 420 can enable the UAV 102 to travel in space (3D environments) physically and precisely to reach the marked position in the predefined location, and accurately maneuver at the AOI or predefined location. The UAV 102 can be sized, adapted, and configured to be able to continually compare the location of the UAV in physical space to the precise point in the predefined location via proprietary sensor fusion algorithms that allow the UAV 102 to estimate the UAV's temporospatial position with great accuracy in the predefined location. In an exemplary embodiment, the interior and exterior of the predefined location can be mapped using standalone devices, or smartphone, and the likes, prior to installation of the UAV 102, to facilitate the UAV control unit 420 to maneuver the UAV 102 precisely at the predefined location, without hitting anything.

The UAV control unit 420, upon receiving the first maker (first mark & fly marker), and the second maker (second mark & fly marker) from the dual marker unit 414, and/or the singular position (s) by the singular mark and fly unit 414, can enable the UAV 102 to reach the corresponding marked positions automatically or using remote controller 110. The UAV control unit 420 can determine an optimum flight path and speed for the UAV 102 to reach the corresponding marked positions. The UAV control unit 420 can enable the UAV 102 to travel in space (3D environments) physically and precisely to reach the corresponding marked position, and accurately maneuver at the AOI or predefined location. The UAV 102 can be sized, adapted, and configured to be able to continually compare the location of the UAV in physical space to the precise point in the predefined location via proprietary sensor fusion algorithms that allow the UAV 102 to estimate the UAV es temporospatial position with great accuracy in the predefined location.

The other unit(s) 422 can include a VR unit that can enable the processors 402 of the GCS 104 to receive the video feed along with the first marker and second marker or the singular marked point, and/or virtual UAV being overlaid on top of the video feed. The video processing and overlaying unit 418 along with the VR unit can then enable conversion of the video signals and corresponding overlaid markers or virtual UAV into digital video signals. The digital video signals can be stored in memory 408 associated with the GCS 104, and can be transmitted to the display module 406 or VR headset 112 or mobile computing devices of the user 108. Further, the VR unit can enable the processors 402 to process the digital video signals to generate VR based video signals, and can transmit these VR based video signals to the VR headset 112 of the user 108 to provide VR view of the AOI along with any or a combination of the corresponding dual markers or singular marked point or virtual UAV having a tail, without being physically present at the predefined location. The user 108 can then, accordingly continuously assess and rectify maneuvering or directing of the UAV 102 in the AOI.

The UAV control unit 420 can enable the processors 402 to transmit a set of second control signals to the UAV 102 to control the UAV 102, based on one or more flight control and maneuvering instructions provided by the user 108, using the remote controller 110. The GCS 104 can be configured to receive a set of commands signals corresponding to one or more flight control and maneuvering instructions provided by the user 108, through the remote controller 110, and accordingly transmit the set of second control signals to the UAV 102. Based on the set of second control signals received, the engine control unit 310 of the LAV 102 can maneuver and fly the LAV 102 to reach and travel at the predefined location.

The display module 406 of the GCS 104 can include display elements, which may include any type of element which acts as a display. A typical example is a Liquid Crystal Display (LCD). LCD for example includes a transparent electrode plate arranged on each side of a liquid crystal. There are, however, many other forms of displays, for example, OLED displays and Bi-stable displays. New display technologies are also being developed constantly. Therefore, the term display should be interpreted widely and should not be associated with single display technology. Also, the display module may be mounted on a printed circuit board (PCB) of an electronic device, arranged within a protective housing and the display module is protected from damage by a glass or plastic plate arranged over the display element and attached to the housing.

Figure 5:
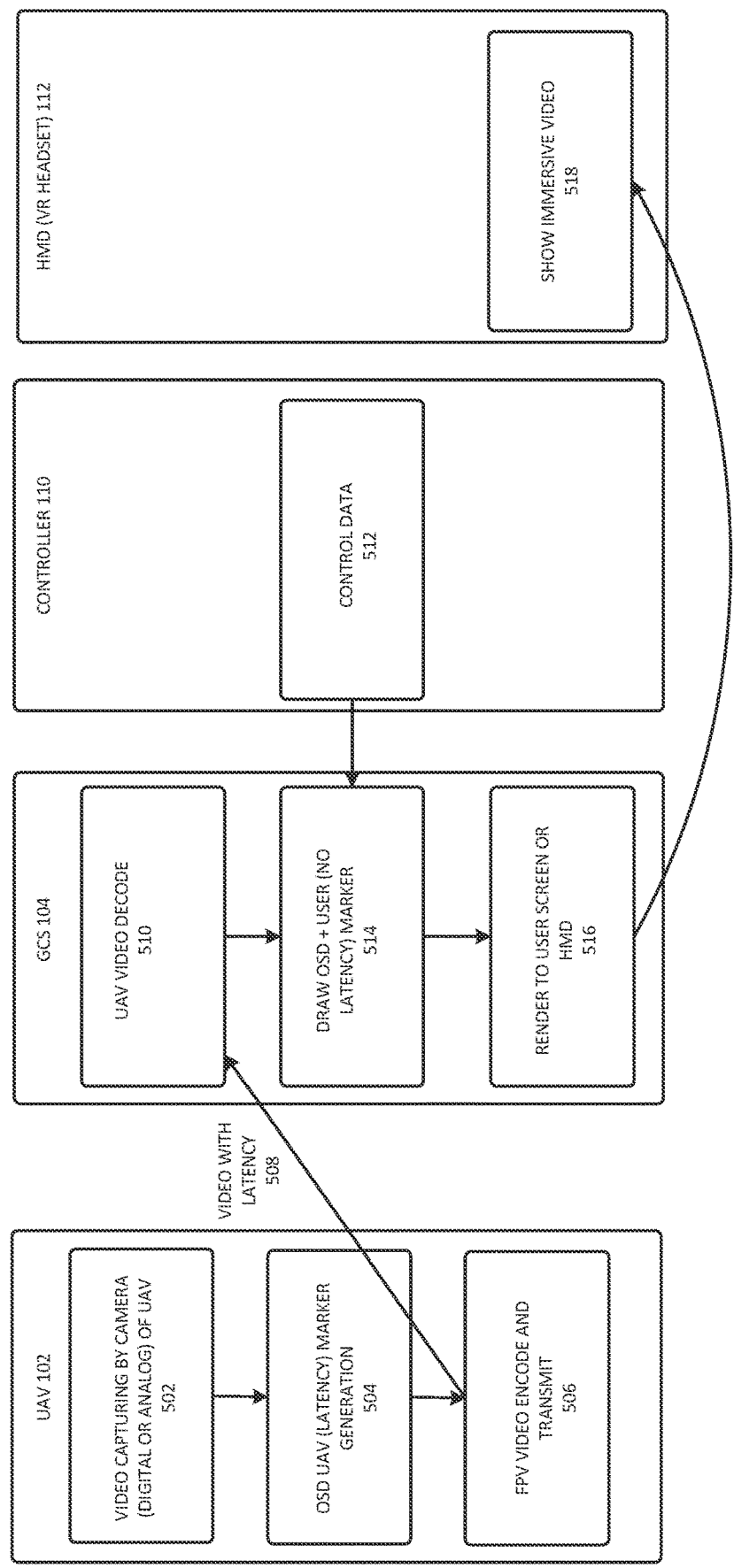
FIG. 5 illustrates an exemplary flow diagram of a first method to facilitate accurate maneuvering of UAV under communication latency between the UAV and the GCS in accordance with an embodiment of the present invention.

As illustrated in FIG. 5, an exemplary flow diagram of a first method to facilitate accurate maneuvering of UAV 102 under communication latency between the UAV 102 and the GCS 104 is disclosed. The first method can include a step 502 of capturing, by camera(s) 306 of the UVA 102, a video feed of the AOI. The method can further include a step 504 of generating a first marker based on command signals received by the UAV 102 from the GCS 104, and overlaying the first marker on the captured video of the AOI in the step 502. The method can further include a step 506 of encoding and encrypting the captured video having the first marker overlaid on it. The encoded and encrypted video can be transmitted to the GCS 104 in a step 508. The encoded and decrypted video can be received at the GCS 104 after a time T from actual capture of the video by the UAV 102 due to latency of time T in video and communication between the UAV 102 and the GCS 104 during transmission in the step 508. The received encoded and encrypted video can then be decoded and decrypted at a step 510, by the GCS 104. At a step 512, the GCS 104 can receive a command signal corresponding to a position where the user wants the UAV 102 to go to in the AOI, based on actuation or movements of the controller 110, directly from the controller 110 associated with the user 108 with almost no or negligible latency. Further, at a step 514, the GCS 104 can further overlay both the first marker and second marker on top of the video feed, and render the video feed along with the two markers and other elements to the display module 106 or VR headset (or HMD) 112 associated with the user 108 in a step 516. Furthermore, at a step 518, the GCS 104 can transmit a VR based of the rendered video feed along with the two markers and other elements, to the VR headset (or HMD) 112 or display module 106 associated with the user 108.

Figure 6:
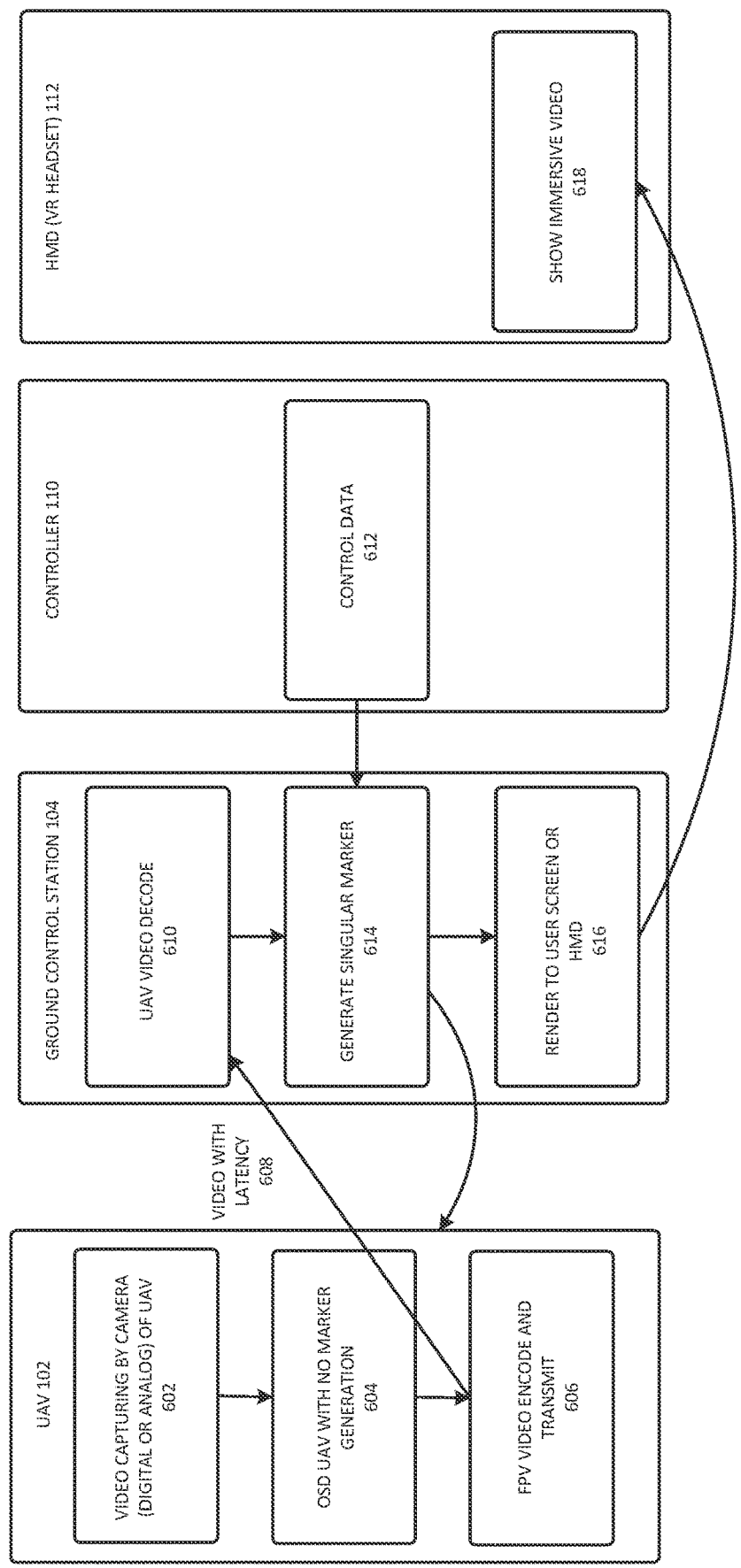
FIG. 6 illustrates an exemplary flow diagram of a second method to facilitate accurate maneuvering of UAV under communication latency between the UAV and the GCS in accordance with an embodiment of the present invention.
Figure 8A:
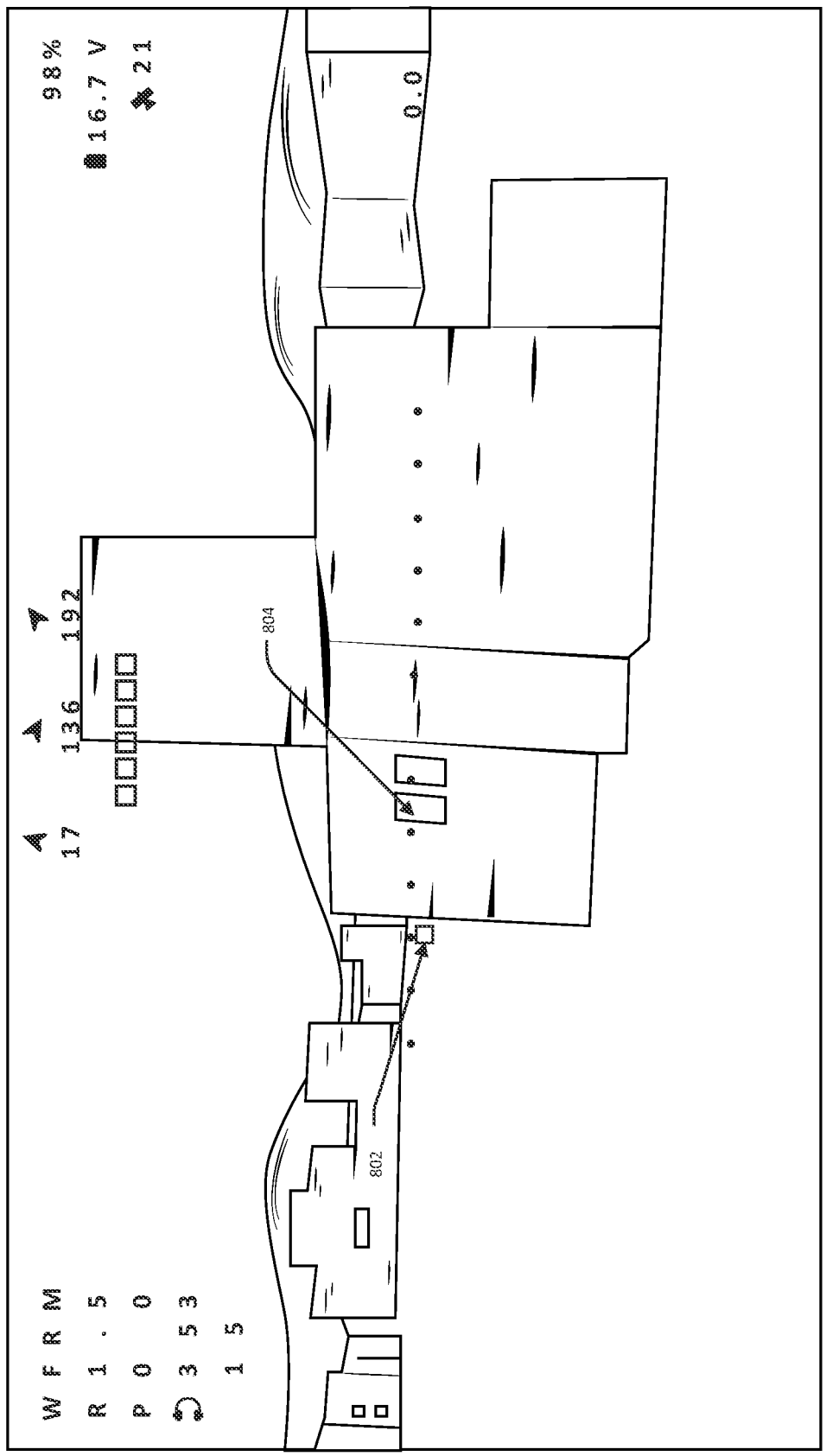
FIG. 8A illustrates an exemplary view of the display module during the implementation of the first method in accordance with an embodiment of the present invention.

FIG. 8A illustrates an exemplary view of the rendered video feed along with the first marker 802, the second marker 804, and other elements being displayed on the display module 106 or VR headset 112, as generated in the first method. The second marker 804 can correspond to a position where the user wants the UAV 102 to go to in the AOI as marked through the controller 110, and the first marker 802 can correspond to the second marker 804 but with a latency of time T, and trailing and following the second marker 804 in the "snake-like" connection. The snake like connection of the two markers 802, 804 provides the user with a path that gradually fades and assists the user 108 to see what the marker will do until the control commands from the controller is registered as flight commands. The rendered video feed of the AOI along with the two markers 802, 804 in snake like connection can facilitate the user 108 to assess how much movement the user is exerting on the UAV 102 through the controller 110, thereby facilitating the user 108 to continuously assess and rectify maneuvering or directing of the UAV 102 in the AOI As illustrated in FIG. 6, an exemplary flow diagram of a second method to facilitate accurate maneuvering of UAV under communication latency between the UAV and the GCS is disclosed. The second method can include a step 602 of capturing, by camera(s) 306 of the UAV 102, a video feed of the AOI. The method can further include a step 604 of generating an on-screen display (OSD) without any marker. The method can further include a step 606 of decoding and encrypting the captured video. The decoded and encrypted video can be transmitted to the GCS 104 in a step 608. The decoded and decrypted video can be received at the GCS 104 after a time T from actual capturing of the video by the UAV 102 due to latency of time T in video and communication between the UAV 102 and the GCS 104 during transmission in the step 608. The received decoded and encrypted video can then be encoded and decrypted at a step 610 by the GCS 104.

At a step 612, the GCS 104 can receive a command signal corresponding to the singular mark and fly positions of the UAV 102 in the AOI based on actuation or movements of the controller 110, directly from the controller 110 associated with the user 108 with almost no or negligible latency. Upon pressing a trigger of the controller 110 for a predefined time, the GCS 104 can generate a raycast vector emanating in the video feed of the AOI. As long as the trigger is kept pressed, the GCS 104 can make the raycast longer (further into a distance) in the video feed. Once, the trigger is released, a singular mark & fly point is detected and transmitted to the UAV 102. Further, at a step 614, the GCS 104 can overlay the generated raycast vector and marked singular point on top of the video feed, and render the video feed along with the singular point and raycast vector. In some implementations, generating the singular marker at step 614 may be aided by a UAV camera registration step. The camera registration step may be performed at step 614 or by a separate camera registration module, then returned to step 614. The camera registration module may perform an analysis and understanding of camera matrix from video stream. In some implementations, additional elements such as drone flight speed, battery life, and other drone related criteria may also be rendered and transmitted to the display module 106 or VR headset 112 associated with the user 108 in a step 616. Furthermore, at a step 618, the GCS 104 can transmit a VR based on the rendered video feed along with the raycast vector, marked singular point, and other elements, to the VR headset 112 of the user 108. The ray cast vector and step by step marking of the marked singular point, by the user, can facilitate the user 108 to continuously assess and rectify maneuvering of the UAV 102 in the AOI, as the singular point(s) 808 allows the user to make one leap after the next in space AOI), irrelevant of latency (as long as the scene itself remains static).

Figure 8B:
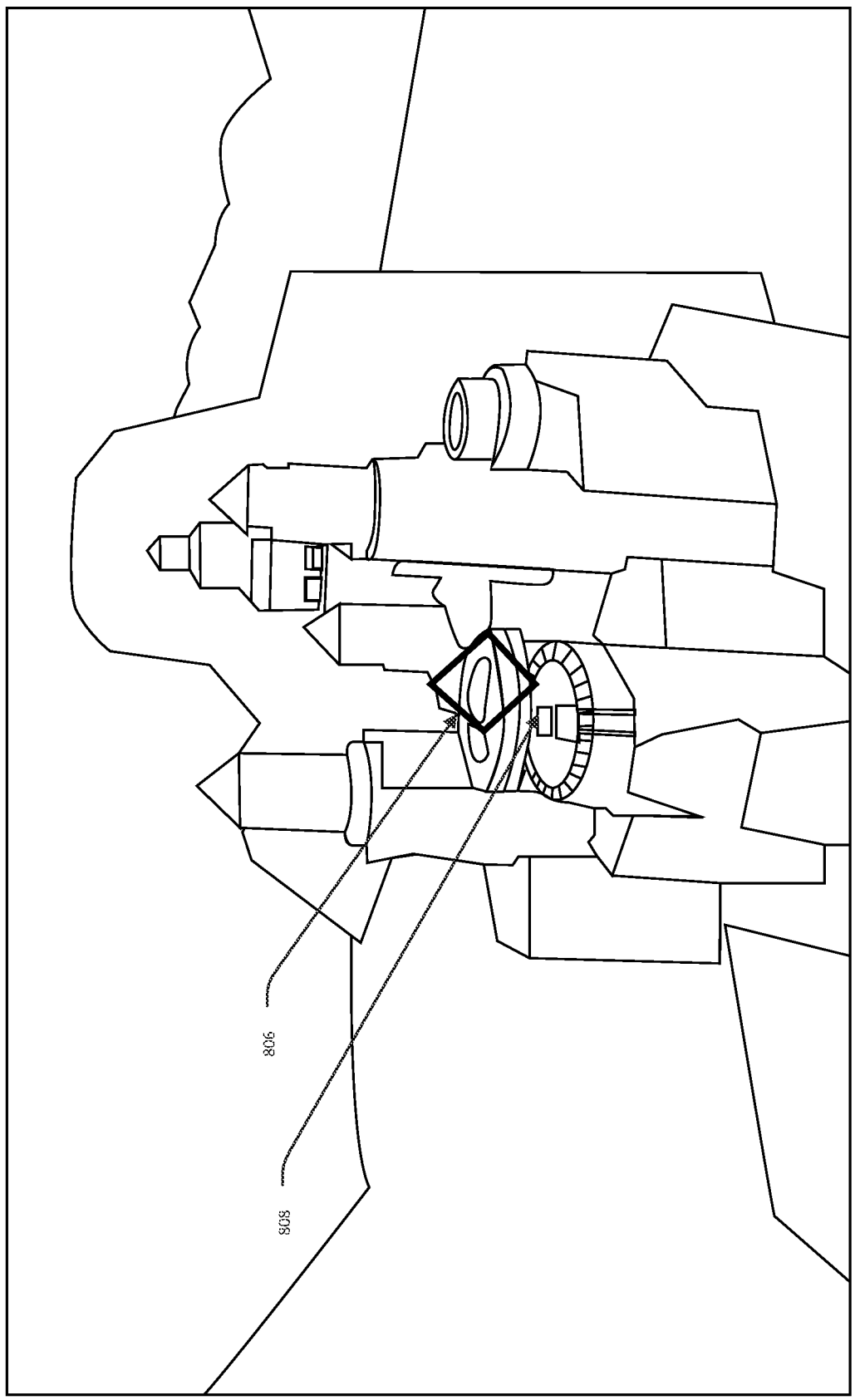
FIG. 8B illustrates an exemplary view of the display module during the implementation of the first method in accordance with an embodiment of the present invention.

FIG. 8B illustrates an exemplary view of the rendered video feed along with raycast vector 806 and marked singular point 808, and other elements being displayed on the display module 106 or VR headset 112, as generated by the second method. The use of raycast vector 806, and step by step marking of the singular mark and fly point 808 instead of the continual mark and fly points/position can facilitate the user 108 in overcoming the latency and assess how much movement the user is exerting on the UAV 102 through the controller 110, thereby facilitating the user 108 to continuously assess and rectify maneuvering or directing of the UAV 102 in the AOI.

Figure 7:
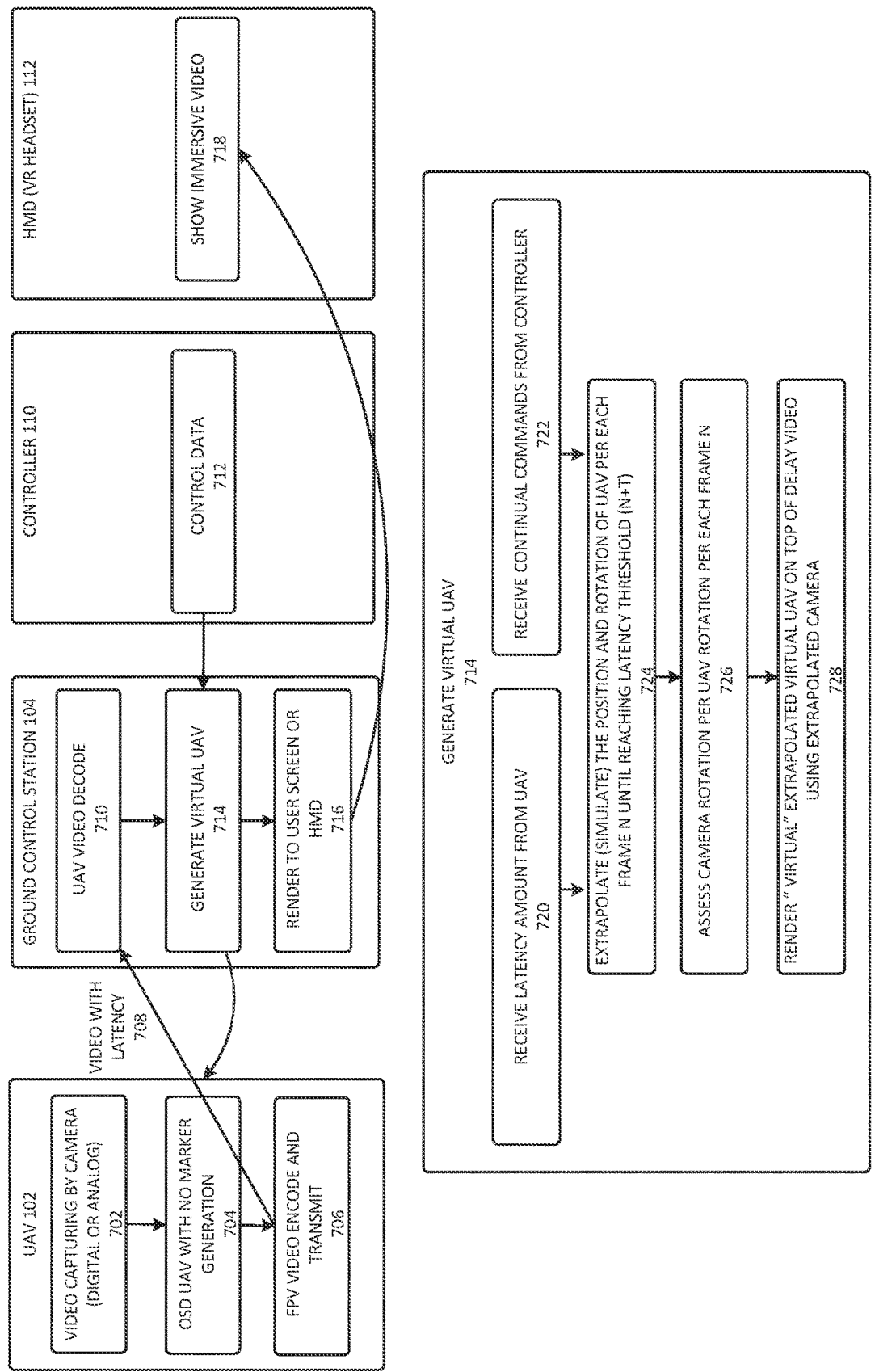
FIG. 7 illustrates an exemplary flow diagram of a third method to facilitate accurate maneuvering of UAV under communication latency between the UAV and the GCS in accordance with an embodiment of the present invention.

As illustrated in FIG. 7, an exemplary flow diagram of a third method to facilitate accurate maneuvering of UAV under communication latency between the UAV and the GCS is disclosed. The third method can include a step 702 of capturing, by camera(s) 306 of the UAV 102, a video feed of the AOI. The method can further include a step 704 of generating an on-screen display (OSD) without any marker. The method can further include a step 706 of decoding and encrypting the captured video. The decoded and encrypted video can be transmitted to the GCS 104 in a step 708. The decoded and decrypted video can be received at the GCS 104 after a time T from actual capturing of the video by the UAV 102 due to latency of time T in video and communication between the UAV 102 and the GCS 104 during transmission in the step 608. The received decoded and encrypted video can then be encoded and decrypted at a step 710, by the GCS 104. At a step 712, the GCS 104 can receive a command signal corresponding to a real-time mark & fly position of the UAV in the AOI based on actuation or movement of the controller 110, directly from the controller 110 associated with the user 108 with almost no or negligible latency. Further, at a step 714, the GCS 104 can assess the latency in the step 708, and the command signals being received directly from the controller 110 in the step 712, and can accordingly determine how the actual UAV 102 shall perform or maneuver in the AOI after time T, and generate a video feed of the AOI having a virtual UAV with trailing tail being overlaid on top of the video feed. Further, the GCS 104 can render the video feed along with virtual UAV with trailing tail, and other elements to the display module 106 or VR headset 112 associated with the user 108 in a step 716. Furthermore, at a step 718, the GCS 104 can transmit a VR based of the rendered video feed along with the virtual UAV and other elements, to the VR headset 112 of the user 108.

The step 714 of the third method can include a step 720 of assessing an amount of latency from the UAV, and a step 722 of receiving command signals directly from the controller 110. The latency may be static, and may also be dynamic due to situations such as but not limited to Mesh Node Hopping. Further, at a step 724, the GCS 104 can extrapolate (simulate) position and orientation of the UAV 102 in the AOI for a predefined number of frames in the time T (latency) based on the latency data and command signals. Further, at a step 726, the GCS 104 can assess rotation of the imaging module or camera(s) 306 of the UAV 102 for the predefined number of frames based on the extrapolated orientation of the UAV. Finally, at a step 728, the GCS 104 can render the virtual UAV having a trailing tail being on top of the video feed suing the extrapolated camera, for each predefined number of frames, to the display module 106 or VR headset 112.

Figure 8C:
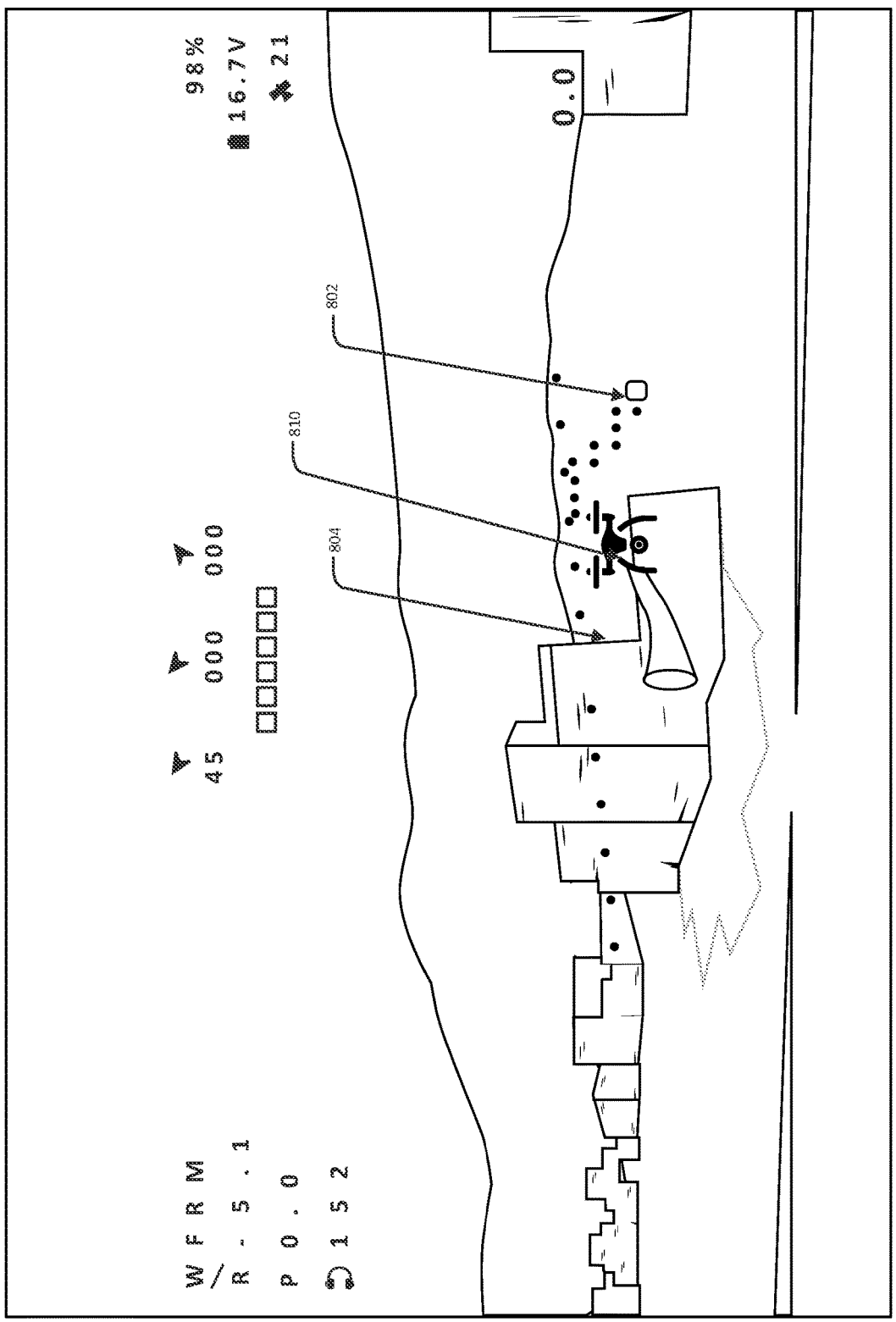
FIG. 8C illustrates an exemplary view of the display module during the implementation of the first method and the third method together, in accordance with an embodiment of the present invention.

FIG. 8C illustrates an exemplary view of the rendered video feed along with the first marker 802 and second marker 804 of the first method, the virtual UAV having trailing tail 810 of the third method, and other elements being displayed on the display module 106 or VR headset 112. The video feed along with the marker 802, 804, and/or virtual UAV 810 being overlaid on top of the live video feed of the AOI can facilitate the user 108 to assess whether the UAV reaches the required position (for instance entering through a window) based on the movement, the user is exerting on the UAV 102 through the controller 110, thereby facilitating the user 108 to accordingly rectify maneuvering or directing of the UAV 102 in the AOI. The assessment of rotation of the imaging module or camera(s) 306 of the UAV 102, by the GCS 104 facilitates extrapolation of the UAV, as the extrapolation virtually depends on understanding that the imaging module or camera(s) 306 has rotated in relation to the virtual drone 810.

Figure 9:
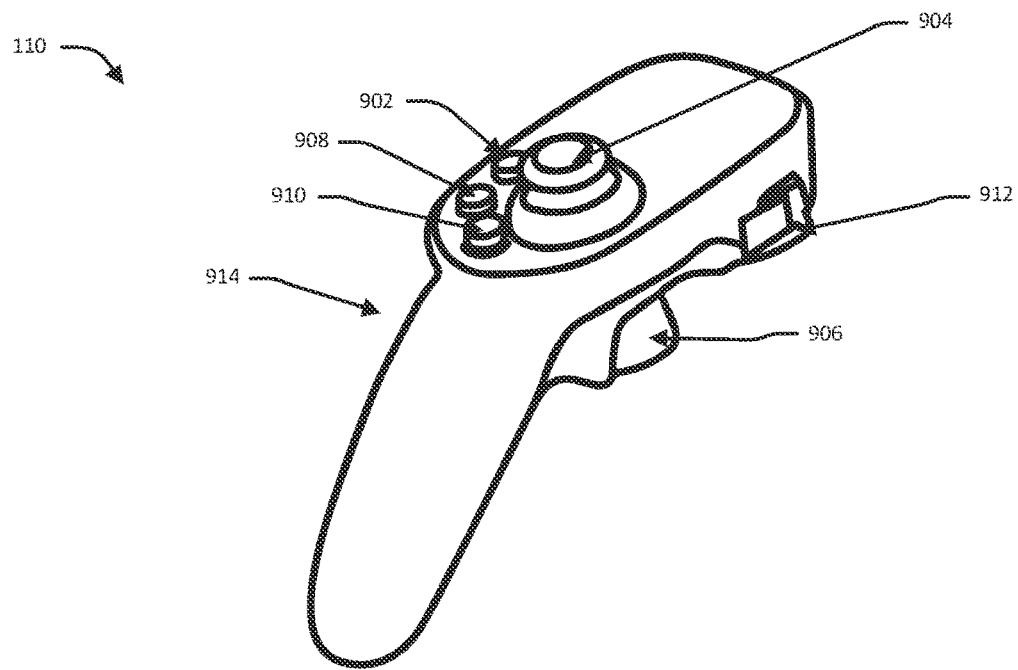
FIG. 9 illustrates an exemplary view of a remote controller in accordance with an embodiment of the present invention.

As illustrated in FIG. 9, the remote controller 110 for controlling the UAV is disclosed. The remote controller 110 (also referred to as controller 110, herein) can include a Radio Frequency (RF) transceiver to communicate with the GCS 104, and UAV 102. The transceiver can allow the user to transmit a set of control signals to the UAV 102, to maneuver and operate the UAV 102 at a predefined location.

The controller 110 can include a take-off button 902 to start and take-off the UAV 102. The controller 110 can include a joystick 904 that can provide 6 degrees of freedom (DOF), but not limited to the like, to ascend/descend the UAV 104 and yaw the UAV 102. The controller 110 can include a Mark and Fly (MNF) button 908 that allows the user to fly the UAV 102 in a mark and fly mode to automatically or semi-automatically navigate the UAV 102 to a marked location. The controller 110 can include a trigger 906 that allows the user to control the speed of the UAV 102. To maneuver the UAV 102 with MNF mode, the trigger 906 can be pulled to adjust the speed, and the controller 110 can be directed by the controlled movement of the controller 110 by the user's hand, to adjust the heading of the UAV 102.

In addition, upon marking the desired location, the GCS 104 can develop a flight plan and automatically maneuver the UAV 102 to reach the desired location. The user can press the trigger 906 to increase the speed of the drone 104 during automatic maneuvering also. The controller 110 can also include a landing button 910, which upon actuation by the user for a predefined time, can allow the UAV 102 to automatically land or return to a docking station. Further, the drone can include other buttons, to perform one or more operations.

In an implementation, as illustrated in the second method and FIG. 7, upon pressing the trigger 906 of the controller 110 for a predefined time, the GCS 104 can generate a raycast vector emanating in the video feed of the AOI. As long as the trigger 906 is kept pressed, the GCS 104 can make the raycast longer (further into a distance) in the video feed. Once, the trigger 906 is released, a singular mark C fly point is detected and transmitted to the UAV 102.

Figure 10:
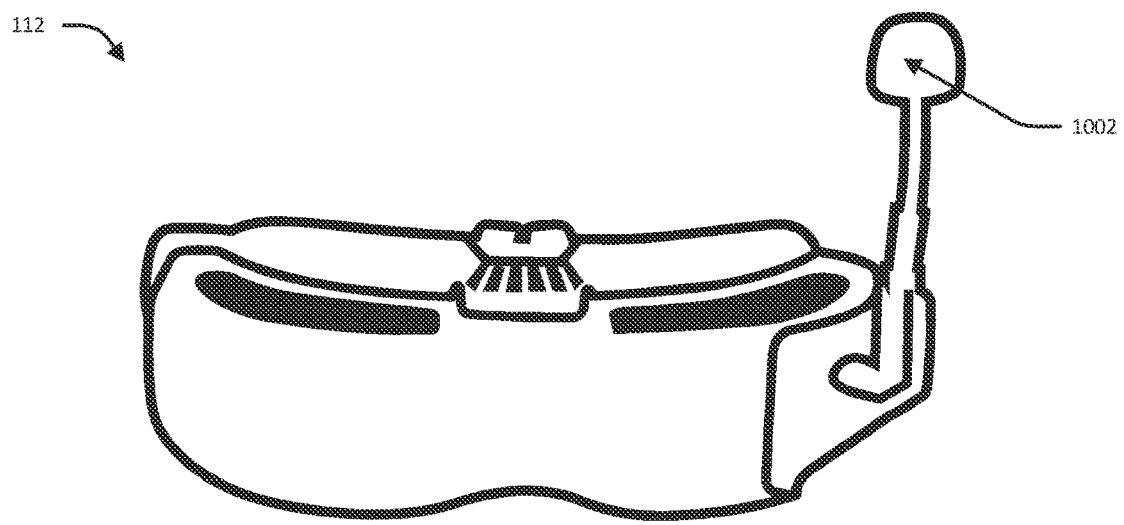
FIG. 10 illustrates an exemplary view of a VR headset in accordance with an embodiment of the present invention.

As illustrated in FIG. 10, an exemplary view of the VR headset 112 is illustrated. The VR headset 100 can include a RF receiver 1002, to communicate with the UAV 102, the GCS 104. The VR headset 1002 can provide a field of view of 46 degrees diagonal to the user, but not limited to the likes. The VR headset 112 can receive the VR based video signals corresponding to the video being captured by the cameras 306 of the UAV 102 in real-time, to give the user a VR based view of the predefined location so that the user can accordingly control the maneuvering and threat handling operations at the predefined location using the UAV 102. The VR headset 112 can include an analog DVR with a SD card to provide recording capability to the VR headset.

In an implementation, the rendered video feed along with the first marker 802 and second marker 804 of the first method, the raycast vector along with singular marked point of the second method, and the virtual UAV having trailing tail 810 of the third method, and other elements, can be received and displayed on the VR headset 112.

In another implementation, the VR headset (or HMD) 112 or a display of the mobile computing device can provide the user with a map or interactive live VR feed of the predefined location, along with an interactive VR based feed captured by the UAV 102, and other functionalities of the UAV 102 to select from. The user 108 can use the controller 110 as a selector or cursor on the interactive live VR feed to select and mark a desired location for the UAV 102 to reach, using gestures controlled by the movement of the controller 110 by the hand of the user. The user 108 can further use the controller 110 as a selector on the interactive VR feed of multiple drones to toggle between multiple UAVs, using gestures controlled by the movement of the controller 110 by the hand of the user. Similarly, the user can use the controller 110 to toggle between other functionalities of the UAV 102.

According to an aspect, the present disclosure elaborates upon a system to facilitate maneuvering of an UAV under communication latency, the system comprising: an UAV comprising an imaging module configured to capture a set of images of an area of interest (AOI), the UAV in communication with a display module and a controller associated with a user, and configured to generate and overlay a first marker on the captured set of images and correspondingly generate a first set of signals, wherein the first marker corresponds to a position of the UAV in the AOI based on actuation of the controller by the user; and a ground control station (GCS), in communication with the display module, the UAV, the controller, and a processor, wherein the processor is in communication with a non-volatile memory comprising a processor-readable media having thereon a set of executable instructions, configured, when executed, to cause the processor to: generate a second marker corresponding to a position where the user wants the UAV to go to in the AOI, based on a second set of signals received from the controller upon actuation of the controller by the user in real-time; receive the first set of signals from the UAV, wherein the first set of signals is received at the GCS after a latency of predetermined time from the actual generation of the first set of signals; and overlay the first marker and the second marker on the set of images associated with the AOI, and correspondingly transmit a third set of signals to the display module; wherein the first marker follows and trails the second marker by the predetermined time, on the set of images of the AOI, and facilitates the user to continuously assess and rectify maneuvering of the UAV in the AOI.

In another aspect, the present disclosure elaborates upon system to facilitate maneuvering of an UAV under communication latency, the system comprising: an UAV in communication with a display module and a controller associated with a user, the UAV comprising an imaging module configured to capture a set of images of an area of interest (AOI), the UAV, and correspondingly generate a first set of signals; and a ground control station (GCS), in communication with the display module, the UAV, the controller, and a processor, wherein the processor is in communication with a non-volatile memory comprising a processor-readable media having thereon a set of executable instructions, configured, when executed, to cause the processor to: generate a raycast vector emanating in the AOI based on a second set of signals received from the controller upon pressing a trigger of the controller; detect and mark a singular point in the AOL based on a third set of signals received from the controller upon releasing of the pressed trigger by the user; receive the first set of signals from the UAV, wherein the first set of signals is received at the GCS after a latency of predetermined time from the actual generation of the first set of signals; overlay the emanating raycast vector and the marked singular point on the received set of images, and correspondingly transmit a fourth set of images to the display module; and develop a route plan for the UAV toward the marked singular point the AOI and persistently maneuver the UAV to the marked singular in the AOI, wherein the overlaid raycast vector and a step by step marking of the marked singular point on the set of images of the AOI facilitates the user to continuously assess and rectify maneuvering of the UAV in the AOI.

In yet another aspect, the present disclosure elaborates upon system to facilitate maneuvering of an UAV under communication latency, the system comprising: an UAV in communication with a display module and a controller associated with a user, the UAV comprising an imaging module configured to capture a set of images of an area of interest (AOI), the UAV, and correspondingly generate a first set of signals; and a ground control station (GCS), in communication with the display module, the UAV, the controller, and a processor, wherein the processor is in communication with a non-volatile memory comprising a processor-readable media having thereon a set of executable instructions, configured, when executed, to cause the processor to: receive a second set of signals from the controller upon actuation of the controller, and the first set of signals from the UAV, wherein the first set of signals is received at the GCS after a latency of predetermined time from the actual generation of the first set of signals; extrapolate position and orientation of the UAV in the AOI for a predefined number of frames in the predetermined time; assess rotation of the imaging module of the UAV for the predefined number of frames based on the extrapolated orientation of the UAV; overlay the extrapolated UAV on the received set of images associated with the AOI, and correspondingly transmit a third set of signals to the display module; wherein the overlaid extrapolated UAV on the set of images corresponds to an estimated position of the UAV in the AOI after the predetermined time, which facilitates the user to assess and rectify maneuvering of the UAV in the AOI.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or inure machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure, importantly, such phrases do not necessarily refer to the same embodiment.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A system for determining and visualizing communication latency while maneuvering at least one unmanned aerial vehicle (UAV), the system comprising:
   a ground control station (GCS) including a display, at least one transceiver, at least one processor, and a non-transitory processor-readable medium storing thereon a set of executable instructions that, when executed by the at least one processor, cause the at least one processor to:
   establish a communication channel between at least one controller and the at least one UAV;
   receive a persistent second marked singular point indicative of an Area of Interest (AOI) from the at least one controller, wherein the persistent second marked singular point is based at least in part on a user input to the at least one controller;
   transmit the persistent second marked singular point to the at least one UAV, wherein the persistent second marked singular point instructs the at least one UAV to move towards the persistent second marked singular point;
   receive via the at least one transceiver a live video feed from the at least one UAV and at least one UAV communication unit, the live video feed containing the AOI;
   receive a duration indication of a continuous pressing of a trigger of the at least one controller;
   render a raycast vector in the live video feed of the AOI while the trigger is continuously pressed, wherein the GCS renders the raycast vector into a distance in the rendered displayed live video feed based on the duration;
   determine a communication latency of the live video feed from the at least one UAV;
   determine a first marked singular point based at least in part on the determined communication latency of the live video feed from the at least one UAV;

render a display video feed using the live video feed from the at least one UAV, the persistent second marked singular point, and the first marked singular point, wherein the displayed live video feed further includes a visual connection between the persistent second marked singular point and the first marked singular point; and transmit the rendered display video feed to the display.

2. The system of claim 1, wherein the set of executable instructions, when receiving via the transceiver the live video feed from the at least one UAV and the at least one UAV communication unit, the live video feed containing the at least one AOI, is further configured, when executed by the at least one processor, to: provide a pre-rendered overlay of the persistent second marked singular point transmitted by the GCS, wherein a delay between a received marker requested from the at least one UAV and the pre-rendered overlay of the persistent second marked singular point is used to determine the communication latency.

3. The system of claim 1, wherein to determine the communication latency of the live video feed from the at least one UAV, the set of executable instructions is further configured, when executed by the at least one processor, to: receive a timestamped message from the at least one UAV.

4. The system of claim 1, wherein the set of executable instructions is configured to transmit the persistent second marked singular point to the at least one UAV based at least in part on a command received from the at least one controller.

5. The system of claim 1, wherein the connection rendered between the persistent second marked singular point and the first marked singular point is rendered as a connection path, wherein the connection path provides a user with the connection path on the displayed live video feed that gradually fades based at least in part on the communication latency.

6. The system of claim 1, wherein the set of executable instructions, is further configured, when executed by the at least one processor, to cause the at least one processor to:
receive an indication of a release of the trigger of the at least one controller; and
determine the persistent second marked singular point indicative of the AOI from the at least one controller, wherein the persistent second marked singular point is based at least in part on the indication of the release of the trigger of the at least one controller, wherein the pressing duration of the trigger of the at least one controller represents the length of the raycast vector in front of the at least one UAV.

7. The system of claim 1, wherein the set of executable instructions, is configured, when executed by the at least one processor, to cause the processor to:
receive at least one of a UAV speed and a UAV position from the at least one UAV;
extrapolate a flight path of the at least one UAV towards the persistent second marked singular point, based on at least one of: the UAV speed, and the UAV position; and
render a visual representation of the flight path of the at least one UAV in the rendered displayed live video feed.

8. The system of claim 7, wherein to render the visual representation of the flight path of the at least one UAV in the rendered displayed live video feed, the set of executable instructions, is further configured, when executed by the at least one processor, to cause the at least one processor to:
asses a rotation of the at least one UAV from a predefined number of frames of the displayed live video feed; and
render the visual representation of the flight path of the at least one UAV and a virtual UAV representation of the at least one UAV drone at the asserted rotation of the at least one UAV in the rendered displayed live video feed.

9. The system of claim 1, wherein to render displayed live video feed using the live video feed from the at least one UAV the set of executable instructions, is further configured, when executed by the at least one processor, to cause the at least one processor to:
extrapolate based at least in part on the communication latency, at least one of a UAV position, and a UAV rotation based on an at least one frame of the displayed live video feed from the at least one UAV until a communication latency threshold is reached;
assess a camera rotation per the at least one frame of the displayed live video feed from the at least one UAV; and
render the virtual UAV on the displayed live video feed having a trailing trail.

10. A computer implemented method to manage communication latency while maneuvering a UAV, the method comprising:
establishing communication with at least one controller, the UAV, and a display;
receiving a persistent marked singular point indicative of an Area of Interest (AOI) from the at least one controller, wherein the persistent second marked singular point is based at least in part on a user gesture of the at least one controller;
transmitting the persistent second marked singular point to the UAV, wherein the persistent second marked singular point instructs the UAV to move towards the persistent second marked singular point;
receiving a live video feed from the UAV and at least one UAV communication, wherein the live video feed includes the AOI;
receiving a duration indication of a continuous pressing of a trigger of the at least one controller;
rendering a raycast vector in the live video feed of the AOI while the trigger is continuously pressed, wherein a GCS renders the raycast vector into a distance in the rendered displayed live video feed based on the duration;
determining a communication latency of the live video feed from the UAV;
determining a first marked singular point based at least in part from the UAV live video feed;
rendering a display video feed using the live video feed, the persistent second marked singular point, and the first marked singular point, wherein the displayed live video feed further comprises a connection rendered between the persistent second marked singular point and the first marked singular point; and
transmitting the rendered display video feed to the display.

11. The method of claim 10, wherein the step of rendering the display video feed, the persistent second marked singular point, and the first marked singular point further comprises:
based at least in part on the latency, extrapolating at least one of: a UAV position, and a UAV rotation based at least in part on at least one frame of the live video feed from the UAV until a communication latency threshold is reached;

assessing a camera rotation per the at least one frame of the live video feed from the UAV; and rendering a virtual UAV on the live video feed from the UAV.

12. The method of claim 10, wherein the step of receiving the live video feed from the UAV and the at least one UAV communication, further comprises: determining the communication latency based at least in part on a time stamp of the received live video feed from the UAV and the at least one UAV communication.

13. The method of claim 10, wherein the step of transmitting the persistent second marked singular point to the UAV is based on receiving an indication of a release of the trigger of the at least one controller by a user.

14. The method of claim 10, wherein the connection rendered between the persistent second marked singular point the first marked singular point is rendered as a connection path, wherein the connection path provides a user with a path on the display video feed that gradually fades based at least in part on the communication latency.

15. The method of claim 13, further comprising:
receiving an indication of the release of the trigger of the at least one controller by the user; and determining the persistent second marked singular point indicative of the AOI from the at least one controller, wherein the persistent second marked singular point is based on the indication of the release of the trigger of the at least one controller by the user.

16. The method of claim 13, further comprising:
receiving at least one of; a UAV speed, and a UAV position from the UAV;
extrapolating a flight path of the UAV towards the persistent second marked singular point based on the at least one of; the UAV speed, and the UAV position; and
rendering a visual representation of the flight path of the UA Vin the rendered display video feed.

17. The method of claim 16, wherein the step of rendering the visual representation of the flight path of the UAV in the rendered display video feed, further comprises:
assessing a rotation of the UAV from a predefined number of frames of the live video feed;
and rendering the visual representation of the flight path of the UAV, a virtual UAV representation of the UAV at the assessed rotation of the UAV in the rendered display video feed.

18. A computer program product for determining and visualizing communication latency while maneuvering an Unmanned Aerial Vehicle (UAV), the computer program product comprising: a non-transitory processor-readable medium storing thereon a set of executable instructions that when executed by at least one processor cause the at least one processor to:

establish a communication channel between at least one controller and the UAV;

receive a persistent second marked singular destination point indicative of an Area of Interest (AOI) from the at least one controller, wherein the persistent second marked singular destination point is based at least in part on a user input;

transmit the persistent second marked singular destination point to the UAV, wherein the UAV is instructed to automatically move towards the persistent second marked singular destination point;

receive via a transceiver, a live video feed from the UAV, the live video feed containing the AOI;

receive a duration indication of a continuous pressing of a trigger of the at least one controller;

render a raycast vector in the live video feed of the AOI while the trigger is continuously pressed, wherein a GCS renders the raycast vector into a distance in the rendered displayed live video feed based on the duration;

determine a communication latency of the live video feed from the UAV;

determine a first marked singular UAV point based at least in part on the determined communication latency of the live video feed from the UAV;

render a display video feed using the live video feed from the UAV, the persistent second marked singular destination point, and the first marked singular UAV point, wherein the display video feed further includes a visual connection between the persistent second marked singular destination point and the first marked singular UAV point; and transmit the rendered display video feed to the display.

* * * * *